(12) United States Patent
Kim et al.

(10) Patent No.: US 10,089,535 B2
(45) Date of Patent: Oct. 2, 2018

(54) DEPTH CAMERA BASED DETECTION OF HUMAN SUBJECTS

(71) Applicant: KT CORPORATION, Seongnam-i, Gyeonggi-do (KR)

(72) Inventors: Byungmin Kim, Seoul (KR); Jae Cheol Kwon, Sejong-si (KR); Sang-min Park, Seongnam-si (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 427 days.

(21) Appl. No.: 14/876,912

(22) Filed: Oct. 7, 2015

(65) Prior Publication Data
US 2016/0098603 A1    Apr. 7, 2016

(30) Foreign Application Priority Data
Oct. 7, 2014    (KR) .................. 10-2014-0135266

(51) Int. Cl.
| | |
|---|---|
| *G06T 19/00* | (2011.01) |
| *G06T 19/20* | (2011.01) |
| *G06K 9/00* | (2006.01) |
| *G06Q 30/02* | (2012.01) |
| *G06T 7/70* | (2017.01) |
| *G06T 7/246* | (2017.01) |

(52) U.S. Cl.
CPC ..... *G06K 9/00771* (2013.01); *G06K 9/00362* (2013.01); *G06Q 30/0201* (2013.01); *G06T 7/248* (2017.01); *G06T 7/70* (2017.01); *G06T 2207/10028* (2013.01); *G06T 2207/30196* (2013.01)

(58) Field of Classification Search
CPC ............. G06T 7/00; H04N 7/173; G06K 9/00
See application file for complete search history.

(56) References Cited

U.S. PATENT DOCUMENTS

| | | | |
|---|---|---|---|
| 9,292,923 B2 * | 3/2016 | Srinivasan | G06K 9/00335 |
| 2003/0169906 A1 * | 9/2003 | Gokturk | G06K 9/00201 |
| | | | 382/115 |
| 2007/0039030 A1 * | 2/2007 | Romanowich | G08B 13/19608 |
| | | | 725/105 |

FOREIGN PATENT DOCUMENTS

| | | |
|---|---|---|
| JP | 10-2003-0018487 A | 3/2003 |
| JP | 10-2005-0089266 A | 9/2005 |
| JP | 10-2012-0016889 A | 2/2012 |
| JP | 10-2014-0007092 A | 1/2014 |

* cited by examiner

*Primary Examiner* — Sathyanaraya V Perungavoor
*Assistant Examiner* — Patricia I Young
(74) *Attorney, Agent, or Firm* — Brundidge & Stanger, P.C.

(57) ABSTRACT

Depth camera-based human subject detecting includes receiving an image captured by a depth camera, converting the image, in a depth camera coordinate system, to an image in a real space coordinate system based on an angle and a position of the depth camera relative to at least one subject of the image, detecting at least one subject from the image in the real space coordinate system, calculating a distance from the depth camera to the at least one subject based on the image in the real space coordinate system and determining whether the at least one subject is a person using criteria that varies depending on the respective distance from the depth camera to the at least one subject.

15 Claims, 8 Drawing Sheets ns: 10,089,535 B2

DEPTH CAMERA BASED DETECTION OF HUMAN SUBJECTS

BACKGROUND

Shopping malls, department stores, airport duty free shops, tourist attractions, etc., may attract hundreds or even thousands of visitors and/or patrons each day. Demographic information regarding such visitors would be valuable for marketing purposes; and statistical information regarding changes in the average number of visitors per day, the average number of visitors by days of the week, seasonal traffic, holiday traffic, etc., may be helpful in improving facility operations and/or resource allotment. Since the use of the customer analysis information leads to increase of sales or reduction of costs, demands for detecting and counting visitors at a specific place have recently increased.

There are many ways to detect or count such visitors or patrons, e.g., using an infrared light sensor or a video camera. Infrared light sensors disposed on opposite sides of an entry way may be utilized to detect the entry and exit of individuals. However, those sensors are unreliable for counting visitors or patrons when multiple individuals pass by the infrared light sensors simultaneously or if one or both of the sensors is blocked by an object. Further, infrared sensors are unable to acquire customer demographic information and analyze the same.

Video cameras may also be deployed to detect and count visitors and/or patrons to an establishment. Corresponding facial recognition capabilities may be utilized to capture some demographic information of such visitors and/or patrons, particularly gender, but there are limitations to the reliability of video cameras especially when the visitors and/or patrons appear simultaneously in large numbers.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

A depth camera captures a depth image having a distance value from the camera to a point corresponding to each pixel of an object. There are various types of depth cameras, respective usage based on methods of distance measuring sensors, such as time of flight (TOE) and structured light. A depth camera may be considered to be similar to a common video camera in that the depth camera continuously captures a scene in front of the camera with a constant resolution; but differences lie in that a value of each pixel of the depth camera is not expressed in terms of brightness or color, but rather in terms of a distance between a spatial object projected onto the camera plane and the camera itself.

In accordance with the example embodiments described herein, a depth camera may be deployed to detect individual human subjects, even as multiple people pass the depth camera simultaneously. The depth camera may also be utilized to acquire additional demographic information of people passing by, even multitudes passing by simultaneously, by being installed substantially horizontally relative to a floor surface, minimizing overlapping of viewed subjects. Devices and apparatuses corresponding to a depth camera may be utilized to implement methods, applications, and programs to detect a human subject in a captured image by calculating a distance from the depth camera to the subject that has yet to be determined or identified as a person, and applying different criteria based on the calculated distance and a setting angle of the depth camera.

Figure 1:
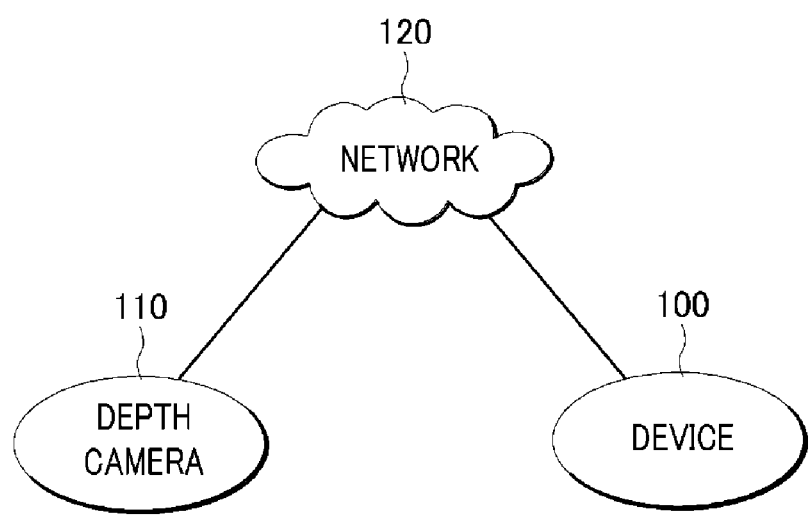
FIG. 1 shows a configuration of a depth camera-based human subject detecting system, in accordance with examples described herein.

FIG. 1 is a configuration diagram of a depth camera-based human object detecting system 1 in accordance with an example embodiment. Referring to FIG. 1, the depth camera-based human object detecting system 1 may include a human subject detecting device 100, a depth camera 110 and a network 120.

Human subject detecting device 100 may be configured, designed, and/or programmed to receive, stream, and/or store either a still image or video images captured by one or more embodiments of depth camera 110. As an example deployment, in a department store having ten (10) separate gate entrances, ten (10) embodiments of depth camera 110 may be installed at the respective gates, and, e.g., five (5) human subject detecting devices 100, each capable of processing, e.g., two (2) cameras, may be communicatively connected to the depth cameras 100 through the network 120.

Human subject detecting device 100 may be further configured, designed, and/or programmed to convert a received or stored captured image from a camera-based coordinate system to an real space coordinate system, using a setting angle and an installation position of the depth camera 110 relative to a subject in the image, recognize one or more subjects in the captured image, calculate a distance from the depth camera to the one or more subjects using the image in the real space coordinate system, and detect a human subject in the image by applying different criteria to the one or more subjects depicted in the image based on the calculated distance and the setting angle of the depth camera 110.

Human subject detecting device 100 may also be configured, designed, and/or programmed to determine a previous path of movement for the detected human subject prior to being captured in the image, determine whether a current path of movement for the human subject can be added to the determined previous path of movement, determine whether the previous path of movement has ended, and identify a starting point and an ending point of the current path of movement for the human subject if the previous path of movement has ended, to determine an entry point and an exit point of the human subject in a predetermined area.

The depth camera 110 may be configured, designed, and/or programmed to transmit the captured or stored image to human subject detecting device 100, via network 120 using a wireless network module for transmitting the captured image to the human object detecting device 100. Alternative embodiments of system 1 may include depth camera 110 transmitting the captured or stored image to human subject detecting device 100 via a wired or wireless network connection, e.g., internet or local area network (LAN), or using a close-range communication technology or protocol including, but not limited to, Bluetooth® or radio frequency (RE) transmissions.

Depth camera 110 may include a depth sensor that is configured, designed, and/or programmed to capture still and/or video images, and further determine a distance from the camera to a point in a captured image corresponding to each pixel therein, within a specific distance of a certain view angle of the camera.

Network 120 may include, but is not limited to, a computer network, an internet, a telephone network, a TCT/IP data network (wide area networks, metropolitan area networks, local area networks, virtual private networks), and any other processing and/or computing devices capable of providing at least communications between depth camera 110 and human subject detection device 100.

Figure 2:
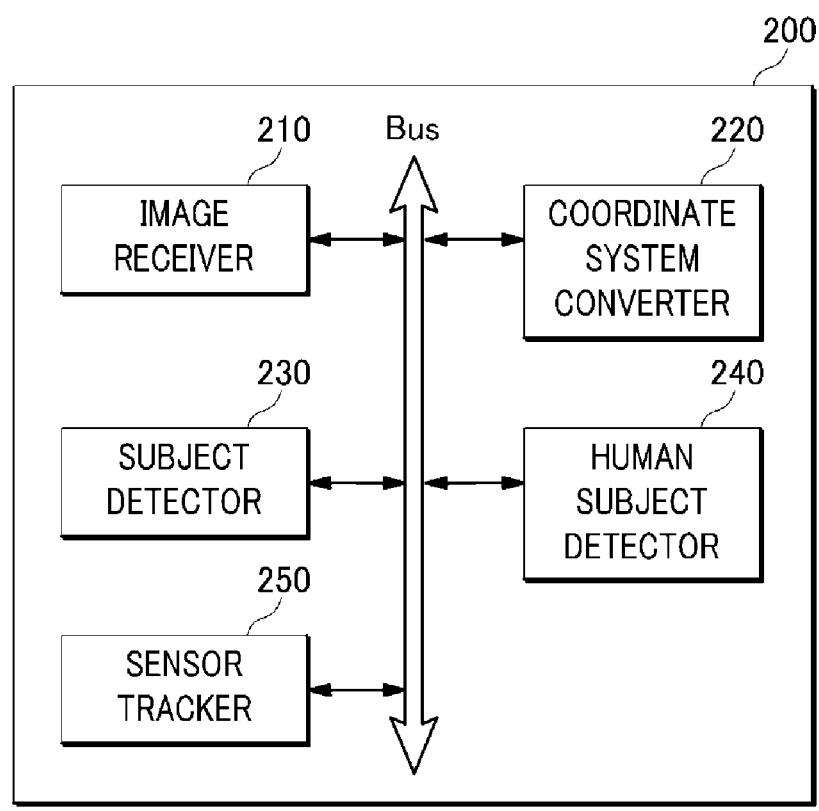
FIG. 2 shows a block diagram of a human subject detecting device, in accordance with examples described herein.

FIG. 2 is a block diagram of the human subject detecting device, in accordance with an example embodiment. Human subject detecting device 100 may include an image receiver 210, a coordinate system converter 220, a subject detector 230, a human subject detector 240, and a sensor 250. Although illustrated as discrete components modules, various components or modules may be divided into additional blocks or modules, combined into fewer blocks or modules, or eliminated, depending on the desired implementation. For example, alternative embodiments may contemplate all or some of the functionality of both depth camera 110 and human subject detection device 100 embodied or implemented by a single device.

Image receiver 210 may be configured, designed, and/or programmed to receive an image captured by depth camera 110. Also, the image receiver 210 may receive the image captured by the depth camera in real time through the network 120 or a wired cable connected to the depth camera.

Coordinate system converter 220 may be configured, designed, and/or programmed to convert the image captured by the depth camera from a camera-based coordinate system to a real space coordinate system, by using a setting angle and an installation position of the depth camera.

Figure 3:
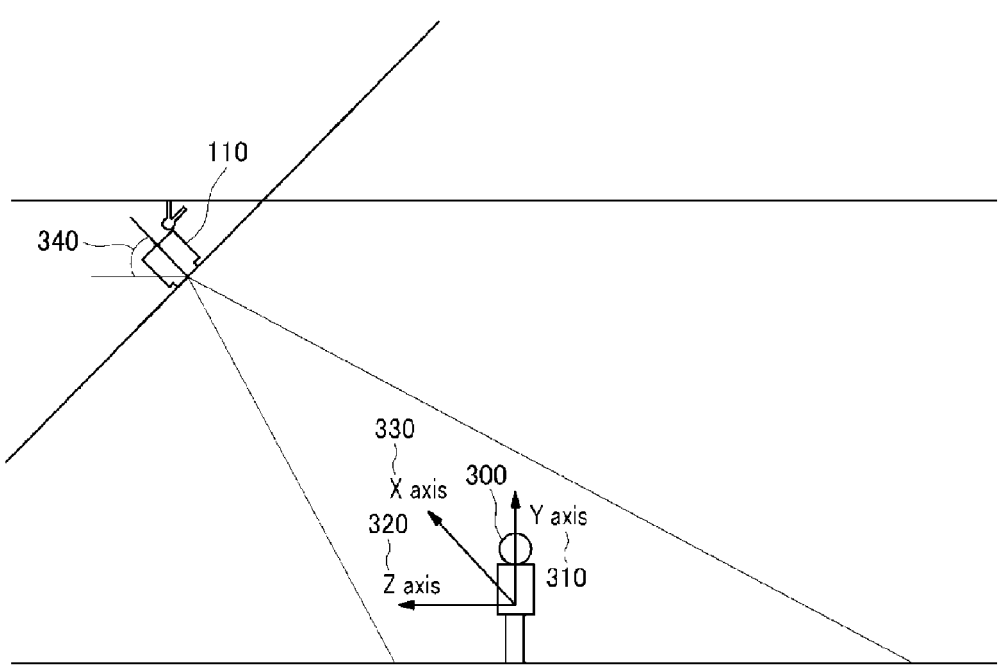
FIG. 3 shows a schematic depiction of how a captured image may be converted from a camera-based coordinate system into an actual space coordinate system, in accordance with examples described herein.

Reference is now made to FIG. 3, which shows a camera schematic depiction of how a captured image may be converted from a camera-based coordinate system into an actual space coordinate system, using a setting angle and an installation position of the depth camera, in accordance with an example embodiment.

Human subject detecting device 100 may be configured, designed, and/or programmed to set external parameters for depth camera 110 such as an installation position and a setting angle 340 of the camera through input by a user. Human subject detecting device 100 may convert a captured or stored image from a camera-based coordinate system to a real space coordinate system, using a setting angle 340 and an installation position of depth camera 110. For the camera-based coordinate system, the camera may be deemed to be an origin of coordinates, the lateral or horizontal directions of the camera may be considered to be the X axis, the vertical directions of the camera may be considered to be the Y axis and the directions in which the camera is set may be considered to be the Z axis. As shown in FIG. 3, for the real space coordinate system, the direction from the floor toward the ceiling may be Y axis 310, a direction of movement of a person 300 in the captured or stored image may be in the direction of Z axis 320, and X-axis 330 may be perpendicular to the Y axis 310 and Z axis 320. The X axis of the camera-based coordinate system and the X axis 330 of the real space coordinate system are identical to each other, and assuming that a position of depth camera 110 is an origin (i.e. X, 0) of the real space coordinate system, an external parameter for depth camera 110 may be X axis of the camera-based coordinate system.

A setting angle 340 of depth camera 110 may represent an angular difference between the Z axis of the camera-based coordinate system and the direction in which the camera captures a subject. For example, a setting angle 340 of the depth camera may be based on values of an axis directed from the floor of the actual space coordinates toward the ceiling thereof for points positioned on a straight line direction, toward which an object moves.

Coordinate system converter 220 may be configured, designed, and/or programmed to convert an image captured and/or stored by depth camera 110 from the camera-based coordinate system to the real space coordinate system using the setting angle 340 of depth camera 110 and a position of depth camera 110 in a real space. As mentioned above, assuming that a position of depth camera 110 is an origin (i.e. X, 0) of the real space coordinate system, the setting angle 340 of depth camera 110 may be only considered. For example, a real space coordinate for each pixel of the image may be calculated by the setting angle 340, i.e., a difference between camera-based coordinate values after installation of the depth camera and coordinates of a position of the camera in the real space coordinate system.

Coordinate system converter 220 may be configured, designed, and/or programmed to set external parameters for depth camera 110 such as an installation position and a setting angle of the camera through input by a user.

Each pixel of an image captured and/or stored by depth camera 110 may present a value for a distance from the depth camera to a target object. Also, each pixel of an image captured by depth camera 110 may be represented by dots in a three-dimensional space in a view from the depth camera. Since the three-dimensional space is set in a view from depth camera 110, it may not be suitable for detecting a real object and estimating a moving direction of the object in the captured or stored image. Accordingly, the image captured by the depth camera may be converted by coordinate system converter 220 from the camera-based coordinate system into the actual space coordinate system.

Subject detector 230 may be configured, designed, and/or programmed to recognize one or more subjects shown in the image captured and/or stored by depth camera 110. Further, subject detector 230 may determine a background model. For example, the background model is determined from an average value of pixels for a specific number of images captured in the environment where no subject exists. Subject detector 230 may calculate similarity between a specific pixel value of an image and the average value of the pixels corresponding to the background model. If the similarity is greater than a reference threshold value that is pre-defined, subject detector 230 may designate the corresponding pixels of the captured image to be background pixels. Subject detector 230 may remove portions of an image that have been determined to be background pixels so as to leave only foreground pixels, thereby efficiently recognizing one or more subjects and/or objects in the image. At this time, the foreground pixels may be related to only subjects and/or objects.

Subject detector 230 may be configured, designed, and/or programmed to classify the one or more detected subjects or objects in the image from the foreground pixels by using a K-means algorithm.

Human subject detector 240 may be configured, designed, and/or programmed to calculate a distance from depth camera 110 to the one or more subjects or objects in the captured or stored image, based on the real space coordinate system, and to further detect a human subject by applying different criteria to the one or more subjects based on the calculated distance and a setting angle of the depth camera.

For example, the human subject detector 240 may be configured, designed, and/or programmed to detect a human subject in the captured or stored image by comparing a subject from the image to first and second reference shapes. Similarities to the first and second reference shapes may respectively contribute to the identification of a subject in an image, such as a person, i.e., detection of a human subject, based on a distance from depth camera 110 and a setting angle of the depth camera. For example, the first reference shape may be similar to the shape of a human head, and the second reference shape may be similar to a human torso.

Human subject detector 240, additionally or alternatively, may be configured, designed, and/or programmed to detect a human subject in an image by comparing an object from the image to an outline or silhouette of a person. The outline or silhouette may vary based on a distance from depth camera 110 to the object as well as a setting angle of depth camera 110.

Sensor 250 may receive a coordinate value of a human subject for each frame of the captured image from human subject detector 240. Sensor 250 may be configured, designed, and/or programmed to determine a point of entry and a point of exit of the human subject that has been detected in the captured or stored image by human subject detector 240, within a predetermined area within the image or relative to depth camera 110 that captured the image. Sensor 250 may determine whether there is a previous path of movement for the human subject by comparing a previous frame of the captured image with a current frame of the captured image, determine whether a current path of movement for the human subject can be added to the previous path of movement, i.e., there is an identical human subject in the previous frame and the current frame, determine whether the previous path of movement has ended, i.e., whether the subject is now stationary, and identify a start point and an end point of the human object if the previous path of movement has ended, to determine an entry point and an exit point of the human object.

For example, sensor 250 may determine whether there is a previous path of movement for the human subject in the image. If there is no path of movement that has been previously tracked, i.e., if a new person appears on a display for the first time in the current frame, sensor 250 may create a new path of movement based on the coordinate value of a human subject for each frame. If a previous path of movement for the human subject exists, i.e., there is an identical human subject in the previous frame and the current frame, sensor 250 may calculate similarity between characteristic information corresponding to an end point of a path of movement for the human object in the previous frame and characteristic information in the current frame to determine whether a current path of movement for the human subject can be added to the previous path of movement. If the similarity is less than a reference threshold value that is pre-defined, i.e., a current path of movement for the human subject is not considered to be continuation of the previous path of movement, sensor 250 may determine that a new person appears in the current frame. Sensor 250 may create a new path of movement from the current frame. Sensor 250 may determine that the previous path of movement has ended for each frame of the captured or stored image. In that case, sensor 250 may identify a start point and an end point of movement for the human subject, and determine that the human subject has entered and exited when the human subject passes the pre-defined area.

Figure 4:
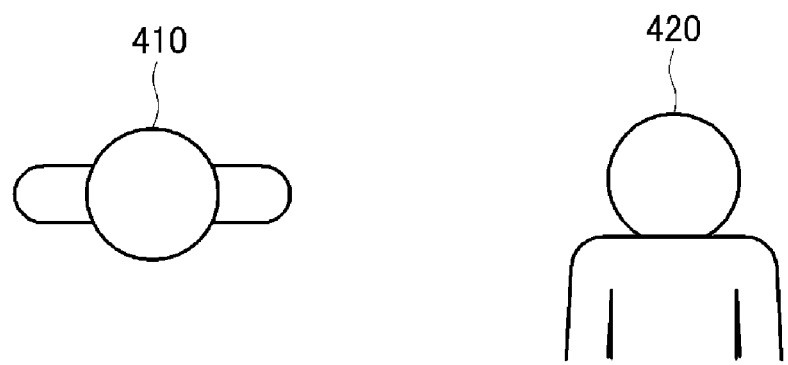
FIG. 4 shows different perspectives of a human subject, seen from a depth camera, as referenced in examples described herein.

FIG. 4 shows different perspectives of a human subject, seen from a depth camera, as referenced in examples described herein. Human subject detecting device 100 may detect a human subject by calculating a distance from depth camera 110 to one or more subject or objects in a captured or stored image based on the real space coordinate system, and applying different criteria to the one or more detected subject or objects, depending on the calculated distance and a setting angle of depth camera 110.

With respect to the different criteria, a similarity to first reference shape 410 and a similarity to second reference shape 420 may be considered to detect a human subject in the image. Referring to FIG. 4, first reference shape 410 may be similar to the shape of a human head, and second reference shape 420 may be similar to the shape of a human torso.

A requirement for a similarity between a subject or object in a captured or stored image and first reference shape 410 and a similarity between a subject or object in a captured or stored image and second shape 420 for identifying the subject or object as a person may different, depending on a measured or detected distance from the detected subject or object in the captured or stored image to depth camera 110 as well as a setting angle of depth camera 110. For example, if a subject or object is present in close proximity to depth camera 110, within a predetermined threshold distance, e.g., 5 meters, it is highly likely that the image will include the head of a human object. Thus, a comparison of the subject or object in the captured or stored image relative to first reference shape 410 may be more heavily weighted than a comparison of the subject or object relative to second reference shape 420 for the identification or detection of the subject or object in the captured or stored image as a human subject. But, as another example, if the subject or object is measured or detected to be further from depth camera 110 beyond the predetermined threshold distance, it is highly likely that the image will include the torso of the human subject, rather than the head. Thus, a comparison of the subject or object in the captured or stored image relative to second reference shape 420 may be more heavily weighted than a comparison of the subject or object in the captured or stored image relative to first reference shape 410 for the identification or detection of the subject or object as a human subject.

Also, the comparison of the subject or object in the captured or stored image relative to either first reference image 410 or second reference image 420 may be variably weighted depending on a setting angle of depth camera 110.

For example, if a setting angle of depth camera 110 is less than a predetermined threshold value, e.g., an angle of 45 degrees, the comparison of the subject or object in the image to second reference shape 420 may be more heavily weighted than a comparison to first reference shape 410, even though the subject or object and depth camera 110 are close to each other. In addition, if a setting angle of depth camera 110 is greater than the predetermined threshold value, the comparison to first reference shape 410 may be more heavily weighted than a comparison to second reference shape 420 even though the object and the depth camera are far from each other.

The threshold similarity of the subject or object detected in the captured or stored image to first reference shape 410 and the threshold similarity of the subject or object to second reference shape 420 may be variably difference for identifying or determining the subject or object to be a human subject, in terms of both a distance from and a setting angle of depth camera 110.

Thus, in accordance with an example embodiment, an angle of installation of depth camera 110 may be variably set; and as the setting angle varies, a similarity of the subject or object relative to first reference shape 410 and a similarity of the subject or object relative to second reference shape 420 may vary, so that the object detection accuracy can be maintained.

Figure 5:
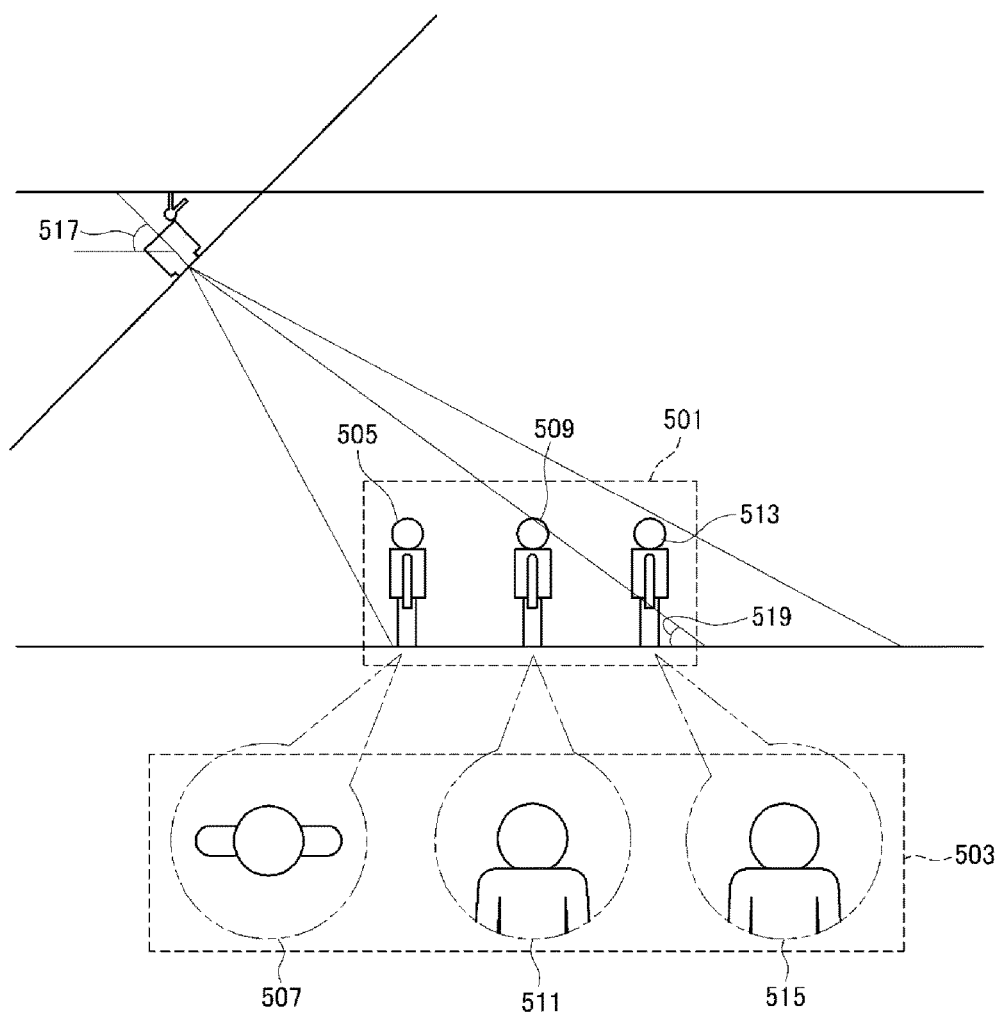
FIG. 5 shows a schematic depiction of human subjects relative to a depth camera, as referenced in examples described herein.

FIG. 5 shows a schematic depiction of human subjects relative to a depth camera, as referenced in examples described herein. Specifically, FIG. 5 shows human shapes 503, which are considered to detect whether objects 501 positioned in different distances from the depth camera correspond to human objects.

The human object detecting device may detect a human subject in view of a detected similarity to a human shape, which may vary based on a distance of the subject or object from depth camera 110 and a setting angle of depth camera 110. For example, to detect whether object 505 is sufficiently close to depth camera 110, relative to other objects 501 positioned at different distances from depth camera 110, to be detected or identified as a human subject, human subject detecting device 100 may compare the captured object 505 to reference shape 507 similar to the shape of a human head.

To detect whether an object 509, located in the middle among other objects 501 positioned at different distances from depth camera 110 to be detected or identified as a human subject, human subject detecting device 100 may compare the captured object 509 to reference shape 511 with a shape similar to a person's head and shoulders.

To detect whether an object 513, located further from depth camera 110 among other objects 501 positioned at different distances from depth camera 110 is to be detected or identified as a human subject, human subject detecting device 100 may compare the captured object 513 to reference shape 515 that is similar to a human torso.

Although not illustrated in FIG. 5, the comparative shapes may vary depending on a setting angle of the depth camera. For example, if the setting angle 517 of depth camera 110 is less than a predetermined threshold value, it is highly likely that the image of a human subject will include the torso. Thus, the object or subject may be compared to reference shape 515 which may be similar to a human torso, to detect whether the object corresponds to a human subject. If the setting angle 517 of depth camera 110 is greater than the predetermined threshold value, it is highly likely that the image will include the head of captured human subject. Thus, the subject or object may be compared to reference shape 507, which may be similar to the shape of a human head to detect whether the subject or object corresponds to a human subject.

The reference shapes may vary relative to both a distance from and a setting angle of depth camera 110. For example, since angle 519, at which an object is seen in an image, varies depending on a distance from and a setting angle of the depth camera, the human shape for detection of whether a subject or object corresponds to a human subject may be set to vary depending on the angle 519, at which an object is seen in an image.

If a setting angle 517 of the depth camera is fixed, human subject detecting device 100 may divide a total length between depth camera 110 and a subject or object into a multiple number of zones, and set a human shape, which will be compared with a captured subject or object, to vary depending on the zones. In addition, human object detecting device 100 may set a reference shape, which will be compared with a captured subject or object, to vary from reference shape 507 similar to a human head to a human torso reference shape 515 in an analog manner, depending on a distance from depth camera 110. In addition, if a setting angle 517 of the depth camera is not fixed, human object detecting device 100 may variably set the reference shape in consideration of both a zone where an object is positioned, and a setting angle of the depth camera.

Figure 6:
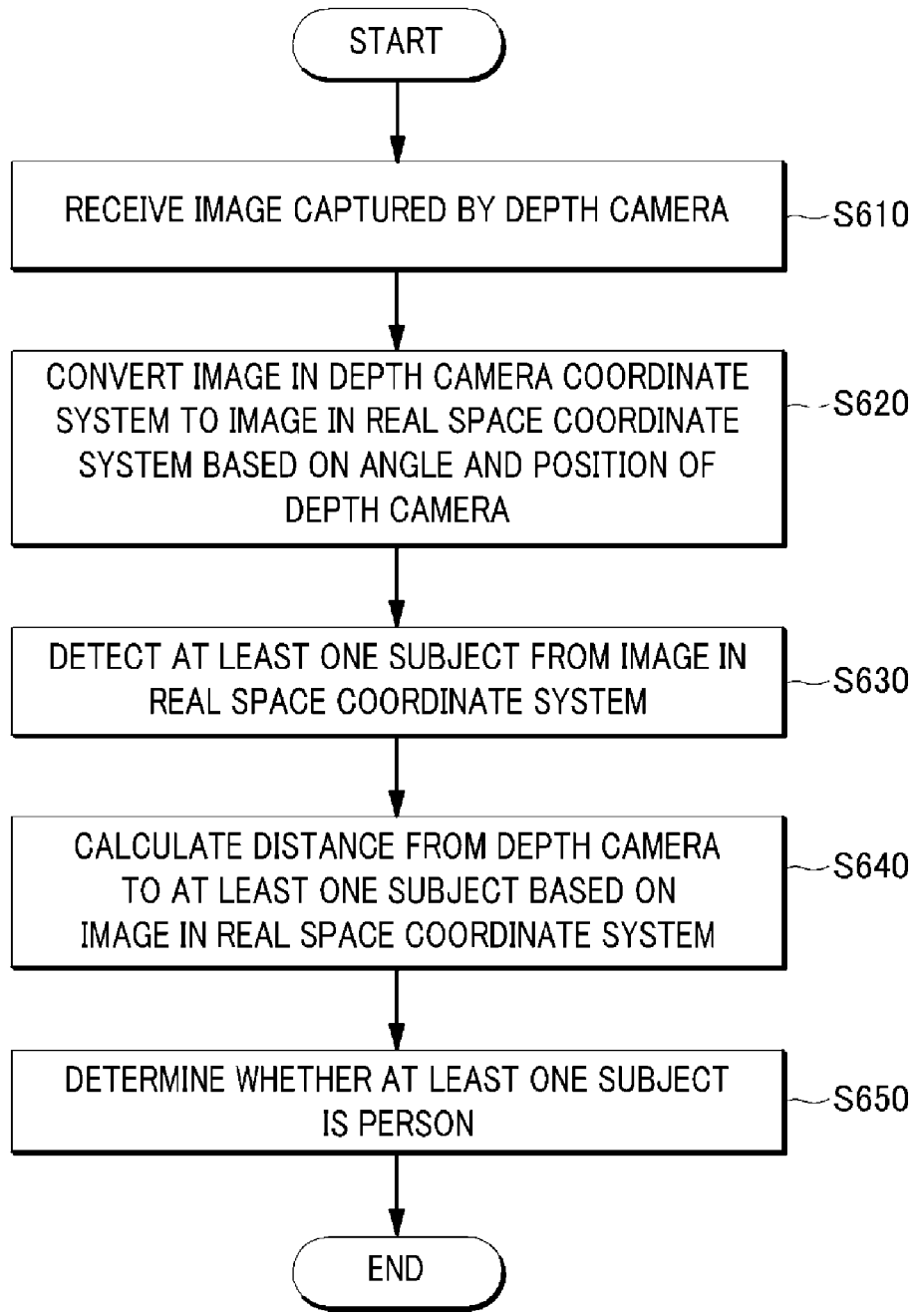
FIG. 6 shows a flow diagram of operations for detecting a human subject in an image, in accordance with example embodiments described herein.

FIG. 6 is a flow diagram of operations for detecting a human subject in an image, in accordance with example embodiments described herein. Referring to FIG. 6, in S610, human object detecting device 100 may receive or store an image captured by depth camera 110. In S620, human object detecting device 100 may convert the captured or stored image from a camera-based coordinate system into an actual space coordinate system, using a setting angle and an installation position of depth camera 110 relative to at least one subject of the image. In S630, human object detecting device 100 may detect one or more subjects or objects from the captured or stored image. In S640, human object detecting device 100 may calculate a distance from depth camera 100 to the one or more subjects or objects based on the actual space coordinate system. In S650, human object detecting device 100 may determine whether the one or more subjects or objects is a person by applying different criteria to the one or more subjects or objects based on the calculated distance and a setting angle of the depth camera.

Figure 7:
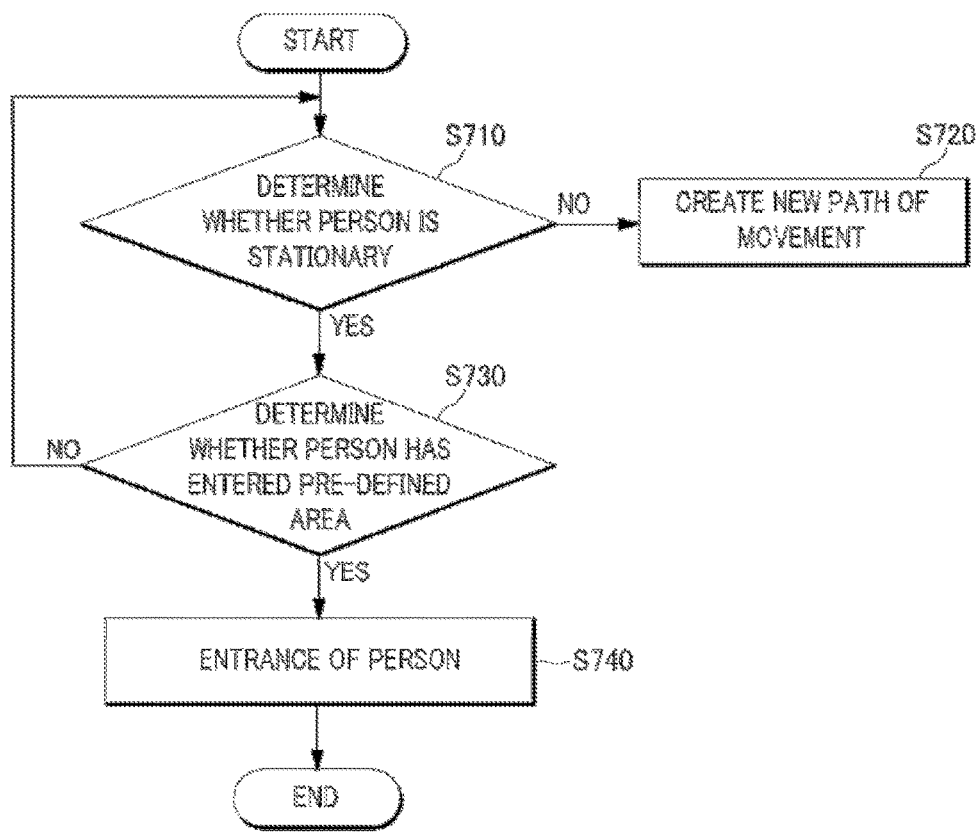
FIG. 7 shows a flow diagram of operations for determining a point of entry and a point of exit of a detected human subject within a predetermined range in a captured image, in accordance with example embodiments described herein.

FIG. 7 is a flow diagram of operations for determining a point of entry and a point of exit of a detected human subject within a predetermined range in a captured image, in accordance with example embodiments described herein. Referring to FIG. 7, in S710, the human object detecting device may determine whether a person is stationary. In S720, the human object detecting device may create a new path. In S730 the human object detecting device may determine whether the person has entered a pre-defined area. In S740, the human object detecting device may determine the entrance of the person and identify a start point and an end point of the person to determine entry and exist of the human object, in S760.

Figure 8:
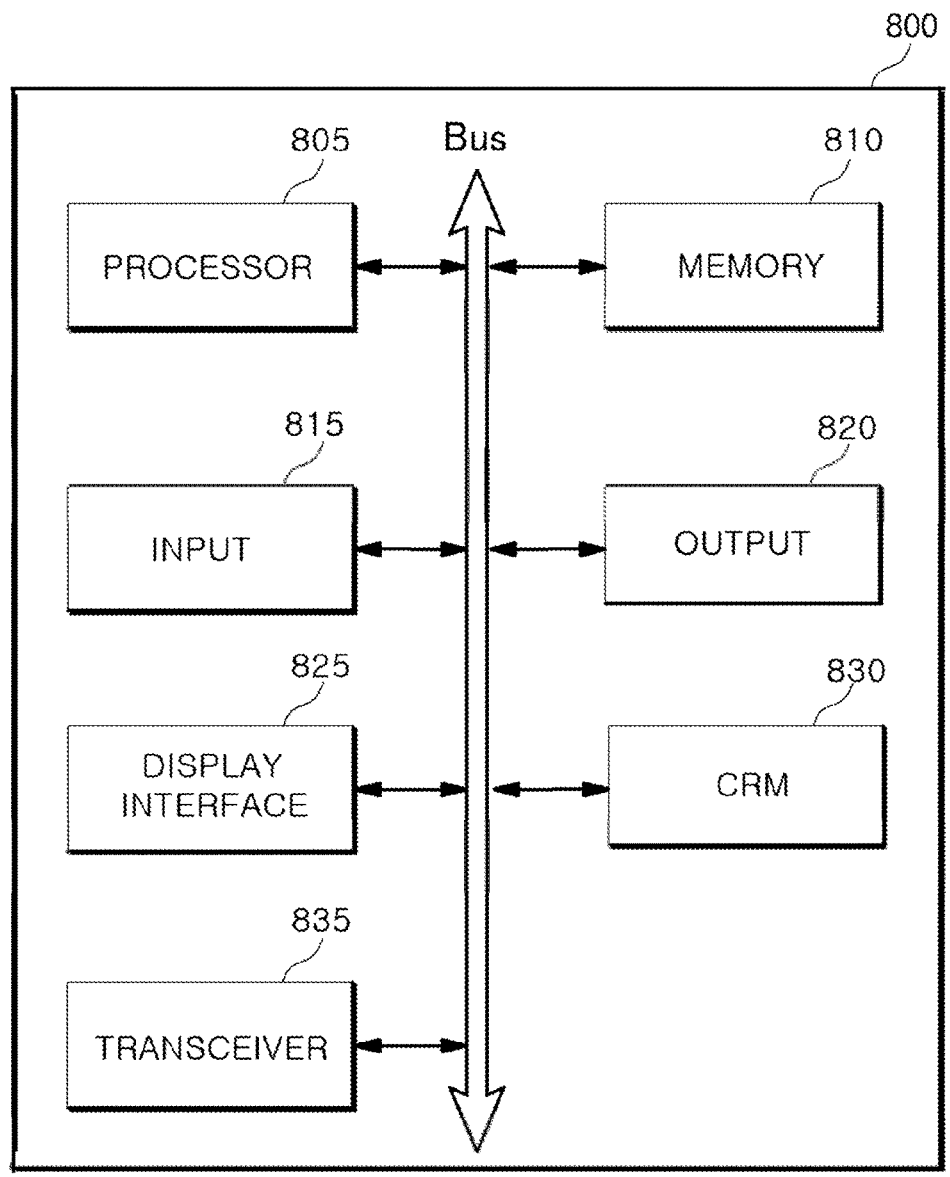
FIG. 8 shows an example computing device on which and by which at least portions of depth camera detection of human subjects may be implemented, arranged in accordance with one or more embodiments described herein.

FIG. 8 shows an illustrative computing embodiment, in which any of the processes and sub-processes of depth camera detection of human subjects may be implemented as computer-readable instructions stored on a computer-readable medium. The computer-readable instructions may, for example, be executed by a processor of any one of depth camera 110 and/or human subject detection device 100, as referenced herein, having a network element and/or any other device corresponding thereto, particularly as applicable to the applications and/or programs described above corresponding to the configuration 100 for profile-based content variation.

In a very basic configuration, a computing device 800 may typically include, at least, one or more processors 805 and a system memory 810. Computing device 500 may also include one or more input components 815, one or more output components 820, a display component 825, a computer-readable medium 830, and a transceiver 835.

Processor(s) 805 may refer to, e.g., a microprocessor, a microcontroller, a digital signal processor, or any combination thereof.

Memory 810 may refer to, e.g., a volatile memory, non-volatile memory, or any combination thereof. Memory 810 may store, therein, an operating system, an application, and/or program data. That is, memory 810 may store executable instructions to implement any of the functions or operations described above and, therefore, memory 810 may be regarded as a computer-readable medium.

Input component 815 may refer to a built-in or communicatively coupled keyboard, touch screen, or telecommunication device. Further, an input component, if not built-in to computing device 800, may be communicatively coupled thereto via short-range communication protocols including, but not limited to, radio frequency or Bluetooth.

Output component 820 may refer to a component or module, which may be built-in or removable from computing device 800, which is configured to output data to an external device.

Display component 825 may refer to, e.g., a solid state display that may have touch input capabilities. That is, a display component may include capabilities that may be shared with or replace those of the aforementioned input components.

Computer-readable medium 830 may refer to a separable machine readable medium that is configured to store one or more programs that embody any of the functions or operations described above. That is, a computer-readable medium, which may be received into or otherwise connected to a drive component of computing device 800, may store executable instructions to implement any of the functions or operations described above. These instructions may be complimentary or otherwise independent of those stored by memory 810.

Transceiver 835 may refer to a network communication link for computing device 800, configured as a wired network or direct-wired connection. Alternatively, a transceiver may be configured as a wireless connection, e.g., radio frequency (RE), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to detect and count people using a depth camera, the method comprising:
   receiving an image captured by the depth camera;
   converting the image, in a depth camera coordinate system, to an image in a real space coordinate system based on an angle and a position of the depth camera relative to at least one subject of the image;
   detecting at least one subject from the image in the real space coordinate system;
   calculating a distance from the depth camera to the at least one subject based on the image in the real space coordinate system; and
   determining whether the at least one subject is a person using criteria that varies depending on a respective calculated distance from the depth camera to the at least one subject,
   wherein the criteria includes a first similarity of the at least one subject with respect to a first shape and a second similarity of the at least one subject with respect to a second shape, and
   wherein the determining includes:
      if the calculated distance is within a predetermined threshold distance, comparing the at least one subject to the first shape; and
      if the calculated distance is beyond the predetermined threshold distance, comparing the at least one subject to the second shape.

2. The method of claim 1, wherein the first shape is that of a human head.

3. The method of claim 1, wherein the second shape is that of a human torso.

4. The method of claim 1, wherein the criteria further includes a third similarity of the at least one subject with respect to a human figure, the human figure being variable based on a distance between the depth camera and the at least one subject.

5. The method of claim 1, wherein the detecting of at least one subject comprises:
   determining background pixels based on an image captured by the depth camera when there is no subject;
   determining foreground pixels from the image in the real space coordinate system based on the background pixels; and
   dividing the foreground pixels into the at least one subject.

6. The method of claim 5, wherein the dividing includes implementing a K-means algorithm.

7. The method of claim 1, further comprising:
   determining whether the person enters into a pre-defined area within a viewing range of the depth camera.

8. The method of claim 7, wherein determining comprises:
   determining whether the person is stationary; and
   determining whether the person has entered the pre-defined area based on a start point and an end point of the person's movement.

9. A device to detect and count people using a depth camera, the device comprising:
   an image receiver configured to receive an image captured by a the depth camera;
   a coordinate system converter configured to convert the image, in a depth camera coordinate system, to an image in a real space coordinate system based on an angle and a position of the depth camera relative to at least one subject of the image;
   an subject detector configured to detect at least one subject from the image in the real space coordinate system; and
   a human subject detector configured to:
      calculate a distance from the depth camera to the at least one subject based on the image in the real space coordinate system,
      determine whether the at least one subject is a person using criteria that varies depending on a respective calculated distance from the depth camera to the at least one subject, wherein the criteria includes a first similarity of the at least one subject with respect to a first shape and a second similarity of the at least one subject with respect to a second shape, compare the at least one subject to the first shape if the calculated distance is within a predetermined threshold distance, and compare the at least one subject to the second shape if the calculated distance is beyond the predetermined threshold distance.

10. The device of claim 9, wherein the first shape is that of a human head.

11. The device of claim 9, wherein the second shape is that of a human torso.

12. The device of claim 9, wherein the criteria further includes a third similarity of the at least one subject with respect to a human figure, the human figure being variable based on a distance between the depth camera and the at least one subject.

13. The device of claim 9, further comprises:
a sensor configured to determine whether the person enters into a pre-defined area within a viewing range of the depth camera.

14. The device of claim 13, wherein the sensor is configured to:
determine whether the person is stationary, and
determine whether the person has entered the pre-defined area based on a start point and an end point of the subject's movement.

15. A computing device to detect and count people using a depth camera, the computing device comprising:
a memory; and
a processing unit configured to:
receive an image captured by the depth camera;
convert the image, in a depth camera coordinate system, to an image in a real space coordinate system based on an angle and a position of the depth camera relative to at least one subject of the image;
detect at least one subject from the image in the real space coordinate system;
calculate a distance from the depth camera to the at least one subject based on the image in the real space coordinate system; and
determine whether the at least one subject is a person using criteria that varies depending on the a respective calculated distance from the depth camera to the at least one subject,
wherein the criteria includes a first similarity of the at least one subject with respect to a first shape and a second similarity of the at least one subject with respect to a second shape, and
wherein the processing unit is configured to determine whether the at least one subject is a person using criteria that varies depending on respective distance from the depth camera to the at least one subject by:
if the calculated distance is within a predetermined threshold distance, comparing the at least one subject to the first shape, and
if the calculated distance is beyond the predetermined threshold distance, comparing the at least one subject to the second shape.

* * * * *